United States Patent [19]

Hughes

[11] Patent Number: 4,564,547
[45] Date of Patent: Jan. 14, 1986

[54] HANDLEABLE SHAPES OF THERMAL INSULATION MATERIAL

[75] Inventor: John T. Hughes, Worcester, United Kingdom

[73] Assignee: Micropore International Limited, Worchestershire, England

[21] Appl. No.: 638,113

[22] Filed: Aug. 3, 1984

[30] Foreign Application Priority Data

Aug. 4, 1983 [GB] United Kingdom ............... 8321104
Oct. 8, 1983 [GB] United Kingdom ............... 8326977
Jan. 11, 1984 [GB] United Kingdom ............... 8400701

[51] Int. Cl.⁴ .............................................. B32B 3/12
[52] U.S. Cl. ..................................... 428/117; 52/806; 156/276; 156/292; 428/331
[58] Field of Search ............... 428/117; 428/116, 118, 428/73, 331; 52/806; 156/276, 292

[56] References Cited

U.S. PATENT DOCUMENTS

| | | | |
|---|---|---|---|
| 2,744,042 | 5/1956 | Pace | 428/117 X |
| 3,210,233 | 10/1965 | Kummer et al. | 428/117 |
| 3,249,659 | 5/1966 | Voelker | 428/117 X |
| 3,644,158 | 2/1972 | Strumbos | 428/117 X |
| 3,649,426 | 3/1972 | Gates, Jr. | 428/117 X |
| 3,869,334 | 3/1975 | Hughes et al. | 428/331 X |
| 3,962,014 | 6/1976 | Hughes et al. | 428/76 X |
| 3,964,527 | 6/1976 | Zwart | 428/117 X |
| 3,998,024 | 12/1976 | Frandsen | 428/117 X |
| 4,299,872 | 11/1981 | Miguel et al. | 428/117 |
| 4,330,494 | 5/1982 | Iwata et al. | 428/117 X |
| 4,399,175 | 8/1983 | Kummermehr et al. | 428/76 |
| 4,447,345 | 5/1984 | Kummermehr et al. | 428/76 X |

Primary Examiner—Henry F. Epstein
Attorney, Agent, or Firm—Browdy and Neimark

[57] ABSTRACT

Handleable and machineable shapes of thermal insulation material are made by compacting finely divided thermal insulation material into the cells of a reinforcing honeycomb structure.

The finely divided thermal insulation material may be, for example, silica aerogel, pyrogenic silica, carbon black, silica gel, volatilized silica, calcium silicate, vermiculite or perlite, or finely divided metal oxides such as alumina or titania. The finely divided thermal insulation material may include an infra-red opacifier and/or reinforcing fibres.

The reinforcing honeycomb structure may be made from, for example, metals such as aluminium foil, inorganic materials such as ceramics, organic materials such as plastics materials, woven fabrics or paper. A rigidiser may be employed.

The shapes of thermal insulation material are substantially rigid and may be machined, for example, by mechanical or laser cutting devices, or may be formed, for example by rolling, into curved or other shaped materials.

14 Claims, 12 Drawing Figures

HANDLEABLE SHAPES OF THERMAL INSULATION MATERIAL

BACKGROUND OF THE INVENTION

The present invention relates to handleable and machineable shapes of finely divided thermal insulation material and to the production of such shapes.

DESCRIPTION OF THE PRIOR ART

Handleable blocks of thermal insulation material have been produced in a number of ways from mixtures of finely divided silica and reinforcing fibre with the optional addition of an opacifying powder and/or a binder. The strength of such blocks depends upon the density of the material, the amount and type of binder used, and on the use of heat treatment. A further important factor is the type of fibre used. The highest strength blocks have contained asbestos fibre, but the use of asbestos is undesirable because it presents a health hazard. Nevertheless, such blocks of thermal insulation material are too weak to be handled in the form of large sheets or panels because the bending strength of the material is low and the panels easily flake or crack.

One method which has been used to overcome these problems is to produce the panels with the thermal insulation material contained within a porous skin in such a way that the skin is lightly bonded to the insulation material and thereby provides added strength. Panels produced by this method have excellent handling properties, but the panels are difficult to machine and cut because such operations cause the bond between the insulation material and the porous skin to be broken.

OBJECT OF THE INVENTION

It is an object of the present invention to provide shapes of finely divided thermal insulation material which can easily be handled in the form of large sheets and which can also readily be machined.

SUMMARY OF THE INVENTION

According to one aspect of the present invention there is provided a thermal insulation material which comprises a reinforcing honeycomb structure and a finely divided thermal insulation material compacted into the cells of the honeycomb structure.

According to a second aspect of the present invention there is provided a method of manufacturing a thermal insulation material comprising the step of compacting finely divided thermal insulation material into the cells of a reinforcing honeycomb structure.

The term "honeycomb" is intended to define herein a cellular structure in which adjacent cells are separated from each other by a thin membrane. Generally, the cells are hexagonal in shape, but are not necessarily so and the term "honeycomb" as used herein includes triangular, other multi-sided and curved cells. The cells are generally of uniform size and shape, but this is not essential.

For a better understanding of the present invention and to show more clearly how it may be carried into effect reference will now be made, by way of example, to the accompanying drawings in which:

DESCRIPTION OF PREFERRED EMBODIMENTS

Figure 1:
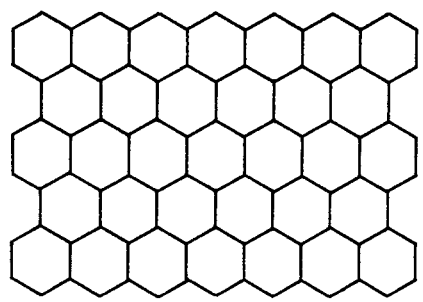
FIG. 1 shows one embodiment of a reinforcing honeycomb structure for use in the present invention.
Figure 2:
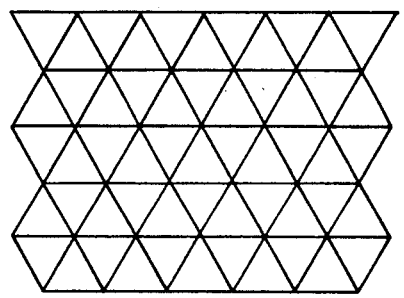
FIG. 2 shows another embodiment of a reinforcing honeycomb structure for use in the present invention.
Figure 3:
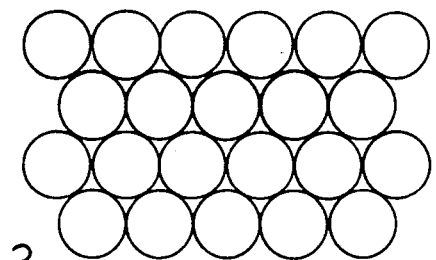
FIG. 3 shows a further embodiment of a reinforcing honeycomb structure for use in the present invention.

The honeycomb structure shown in FIG. 1 is based on a hexagonal cell, whereas the structure shown in FIG. 2 is based on a triagonal cell and the structure shown in FIG. 3 is based on a circular cell.

The material of the honeycomb structure may be selected from a large number of materials including, for example, metals such as aluminum foil, inorganic materials such as ceramics, or organic materials such as plastics materials, woven fabrics or paper. The structure may also be made from a combination of materials. If the material has a low inherent rigidity, additives may be employed. For example, paper may be stiffened with phenolic resin. The material of the honeycomb structure may be a combustible material, but the thermal insulation material incorporating the honeycomb structure is relatively incombustible as will be explained in more detail hereinafter.

Where the thermal insulation material is required to have varying strength, the cell size of the honeycomb structure or the thickness of the material forming the honeycomb structure may be varied in selected areas.

Figure 4:
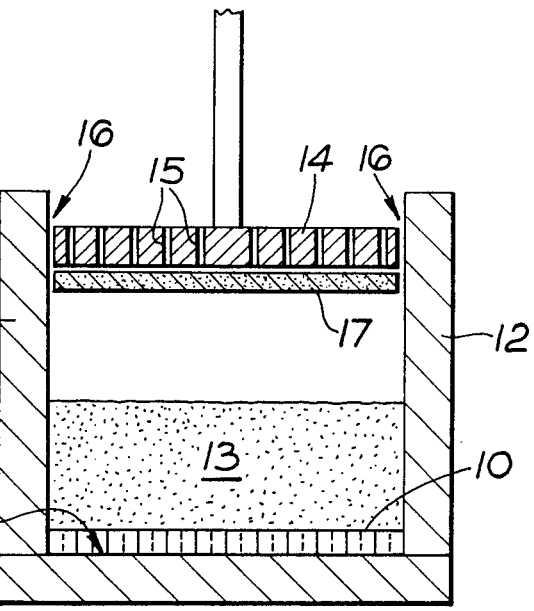
FIG. 4 illustrates one method by which thermal insulating articles according to the present invention may be manufactured.

FIG. 4 illustrates one method by which panels of thermal insulation material according to the present invention may be manufactured.

The honeycomb structure 10 is arranged on a flat surface 11 surrounded by the walls 12 of a mould or die. Insulation material 13, in an amount corresponding to approximately five times the volume occupied by the honeycomb structure, is then poured into the mould or die and spread evenly across the honeycomb structure. The insulation material is compacted into the honeycomb cells by means of a ram 14 which fits inside the walls 12 of the die.

Air is released from the insulation material as it is compacted by using a ram 14 which has a porous surface or by providing apertures 15 extending through the ram. However, for a ram having a small area, it is adequate to allow for air to be released through the gap 16 remaining between the ram and the walls of the die.

Compaction of the insulation material as a result of pressure exerted by the ram moves the ram to or close to the surface of the honeycomb structure. After the pressure is released, the product, which comprises the honeycomb structure containing compacted insulation material, is removed from the die.

The insulation material may project above the level of the honeycomb structure. If desired, the surplus insulation material may be removed by brushing or scraping to leave the insulation material at the same level as the honeycomb structure.

The finely divided insulation material may be a microporous insulation material or may be selected from a wide range of other powders such as silica gel, volatilised silica, calcium silicate, vermiculite and perlite and finely divided metal oxides such as alumina and titania.

Microporous materials are materials which have a lattice structure in which the average interstitial dimension is less than the mean free path of the molecules of air or other gas in which the microporous material is situated. This results in a thermal conductivity which is less than the molecular conductivity of air or other gas in which the material is used. The lattice structure is created within a finely divided material by using a powder with very fine particles which adhere to each other in a chain-like formation. A suitable powder for producing this structure is a finely divided silica in a form normally referred to as silica aerogel or pyrogenic silica. An alternative powder is finely divided carbon black.

For high-temperature use, infra-red opacification may be desirable or necessary and this can be provided by adding to the finely divided material various opacification materials such as reflective metallic powders or metal oxides having a high refractive index such as manganese oxide, chromium oxide, titanium dioxide, iron oxide and zirconium oxide. Infra-red absorbing materials such as carbon black may also be used.

It may be desirable to include in the finely divided thermal insulation material a reinforcing fibre material, particularly where the cell size of the honeycomb structure is greater than about 5 mm across. Such a fibre material may be a ceramic fibre, glass fibre, cotton, rayon or other synthetic fibre, carbon fibre or other fibres generally used for reinforcement purposes.

Any materials that are added to the finely divided material should be thoroughly mixed with the finely divided material prior to the insulation material being poured into the die.

When the finely divided insulation material includes microporous material it may be desirable to modify the above-described method.

For example, when microporous silica is compacted, when the compacting pressure is subsequently released, the volume of the compacted silica may increase by as much as 20 percent. Thus, although the insulation material may be compacted to the level of the honeycomb structure, when the compacting pressure is released the insulation material may expand above the level of the honeycomb structure necessitating a surfacing operation when it is required that the insulation material should be at the same level as the honeycomb structure.

I have found that this can be overcome by arranging on the face of the ram a resilient material 17 which, when the insulation material is under its maximum compacting pressure, will deform where it contacts with the honeycomb structure, but will compact the insulation material below the surface level of the honeycomb structure. When the compacting pressure is released, the insulation material expands such that its surface is at or below the surface level of the honeycomb structure.

An alternative method of compacting the insulation material below the surface level of the honeycomb structure is to position a flexible membrane between the surface of the insulation material and the ram and to provide means for applying fluid pressure to the membrane. When the insulation material has been compacted so that the ram is at or close to the surface level of the honeycomb structure, fluid pressure is applied to the membrane causing further compaction of the insulation material to a level below the surface of the honeycomb structure. The membrane may be made of rubber or a plastics material which is inflated by air supplied through apertures in the ram or through grooves formed in the surface of the ram. Alternatively, a fluid can be trapped permanently in a space between the membrane and the ram.

If desired, a second membrane may be positioned between the honeycomb structure and the surface of the die on which honeycomb structure is supported. By inflating the second membrane it is possible to control the compaction of the insulation material from both faces of the honeycomb structure.

Clearly it is possible for two rams to operate from opposite sides of the honeycomb structure. It is also possible for a skin to be applied to one face of the honeycomb structure before the insulation material is compacted into the structure.

It may also be desirable to support the honeycomb structure on a surface which is perforated to allow air to be released from the insulation material during compaction or to permit evacuation of the insulation material to assist with the compaction process.

The insulation material may be compacted into the honeycomb structure at densities of from 80 to 800 kg per cubic meter as required. The resulting product is substantially rigid to handle and can be machined to give varying thicknesses along its length, to produce shapes as required and to create apertures. The machining may be carried out by mechanical or laser cutting devices.

Figure 5:
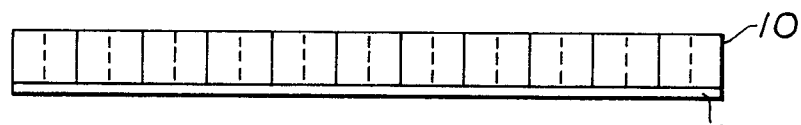
FIG. 5 shows one embodiment of a thermal insulating material according to the present invention.
Figure 6:
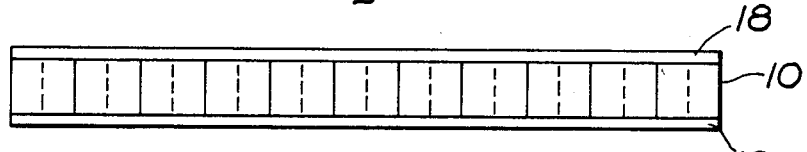
FIG. 6 shows another embodiment of a thermal insulating material according to the present invention.

To ensure that relatively smooth edges are produced when apertures are formed or profiles are machined, it may be desirable to apply a skin 18 to either or both faces of the honeycomb structure 10 as shown in FIGS. 5 and 6 so that the skin is bonded to the honeycomb structure and/or to the insulation material 13. The skin may be of metal, plastics, woven or non-woven fabric, paper or other suitable sheet materials. Other surface treatments may also be applied to the products to improve handling properties, for example they may be coated with paint or a resin material.

Where the skin is a rigid board the products may be used, for example, as insulating walls or as fireproof doors simply by bonding reinforcing skins to the products. Microporous silica is normally severely damaged by contact with liquid water, although it is sometimes possible to provide a treatment which gives a certain amount of water resistance. However, a high level of water resistance is achieved when impervious skins are applied to the product and when the material of the honeycomb structure is impervious to water.

Products according to the present invention are particularly useful where there is a need for lightweight, high strength thermal insulation material having very low thermal conductivity. Heat is conducted through the products both through the compacted thermal insulation material and through the walls of the honeycomb structure. It is surprising that the walls of the honeycomb structure may be extremely thin, but the resulting product has a high strength and rigidity. I have found that this is because the walls of the honeycomb structure are held firmly in position by the compacted thermal insulation material so that the resulting strength of the product is derived from both the honeycomb structure and the thermal insulation material.

It may be expected that the walls of the honeycomb structure might collapse during compaction of the thermal insulation material into the honeycomb structure. However, I have found that as the thermal insulation material is compressed it consolidates and supports the walls of the honeycomb structure and protects them against buckling so that very high moulding pressures can be used.

Since thin walled honeycomb structures may be used, heat conducted through the honeycomb structure is small and the overall thermal conductivity of the product is very similar to the thermal conductivity of the thermal insulation material, especially when low thermal conductivity materials are used for the honeycomb structure.

I have found that even when the material of the honeycomb structure is combustible, the product remains substantially incombustible. This is particularly so when the thermal insulation material comprises microporous silica. When a flame is applied to one surface of the product the thermal insulation material prevents free access to oxygen with the result that any organic materials in the honeycomb structure carbonise and oxidise slowly from the hot face of the product. The low thermal conductivity of the product normally ensures that the cold face of the product remains below carbonisation and oxidation temperatures so that, although part of the honeycomb structure may eventually be destroyed, the remainder of the honeycomb structure holds the thermal insulation material in position so that the product retains its integrity and resists the penetration of fire. If the honeycomb structure is destroyed at the hot face of the product, residual pressure in the thermal insulation material causes the material to expand and to close the gap created by the disappearance of the honeycomb structure, thus protecting the remainder of the honeycomb structure closer to the cold face.

Figure 7:
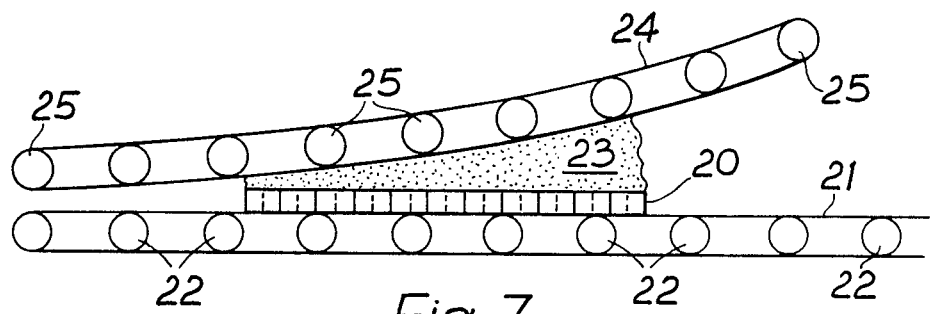
FIG. 7 illustrates another method by which thermal insulating articles according to the present invention may be manufactured.

FIG. 7 illustrates another method by which panels of thermal insulation material according to the present invention may be manufactured.

FIG. 7 shows a honeycomb structure 20 arranged on a flexible belt 21 supported by a number of rollers 22. Insulation material 23, in an amount corresponding to approximately five times the volume occupied by the honeycomb structure, is poured onto the honeycomb structure and the structure is moved by the flexible belt 21 so that the insulation material is compacted into the honeycomb structure by means of a further belt 24 supported by rollers 25, the belt 24 being inclined relative to the belt 21 so as to provide a progressive compaction of the insulation material. If desired, the belts 21 and 24 may be omitted, although some means for initially supporting the insulation material in the honeycomb structure should be provided. Further, it is possible to compact the insulation material between a single pair of rollers instead of multiple rollers as shown in FIG. 7.

Alternatively, the insulation material may be compacted into the honeycomb structure by vibration.

Figure 8:
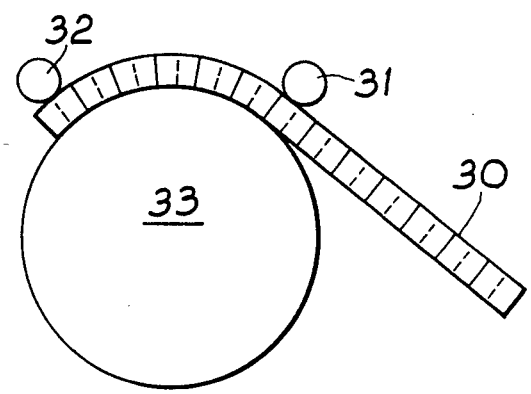
FIG. 8 illustrates a method of forming curved articles of thermal insulation according to the present invention.

Circular, semi-circular or arcuate handleable shapes may be made by forming a panel over a roller as illustrated in FIG. 8. As can be seen from FIG. 8, a panel 30 is formed into a curved shape by means of rollers 31, 32 urging the panel against a forming roller 33. The panel is maintained in its curved shape by applying a skin, or a further skin, to the radially inner face of the panel. The skin, at least after it has been applied to the face of the curved panel, should be substantially inextensible in order to retain the curvature of the panel. Such curved shapes may also be made by forming the honeycomb structure between the rollers 31, 32, 33 and subsequently compacting insulation material into the cells of the honeycomb structure and applying a skin to the radially inner face of the curved shape. The skin may be applied either before or after the insulation material is compacted into the honeycomb structure.

Figure 9:
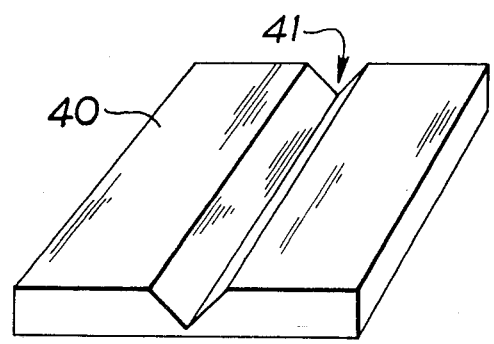
FIG. 9 shows a panel having a single groove machined in one face thereof.
Figure 10:
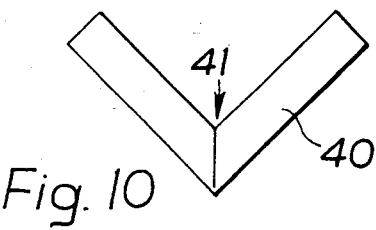
FIG. 10 shows the panel of FIG. 9 with the panel flexed along the line of the groove.

As an alternative to shaping a panel between rollers, shapes approximating to arcuate shapes may be formed, as illustrated in FIGS. 9 and 10, by providing at least the bottom surface of a panel 40 with a flexible coating, for example of glass fibre material. The top surface may also be provided with such a coating. A V-shaped groove 41 is machined in the top surface of the panel and extends substantially to the bottom surface. FIG. 10 shows the panel 40 flexed along the line of the groove 41 so that the panel is in the form of a V and may be used, for example, for insulating small diameter pipes. If desired, an adhesive may be applied to the groove and, in addition or alternatively, the flexed panel may be provided with a coating to maintain it in its flexed shape.

Figure 11:
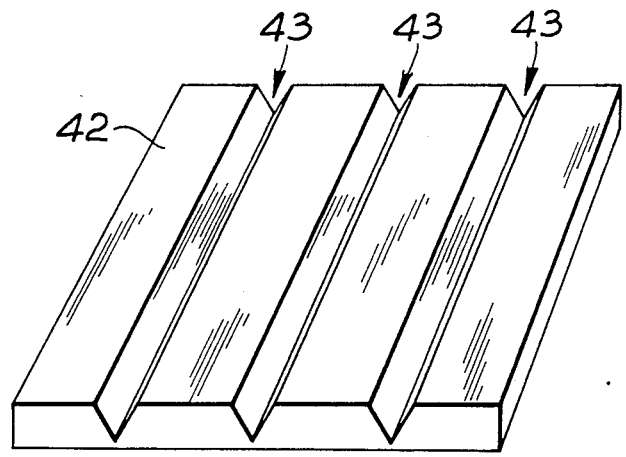
FIG. 11 shows a panel having a number of grooves machined in one face thereof.
Figure 12:
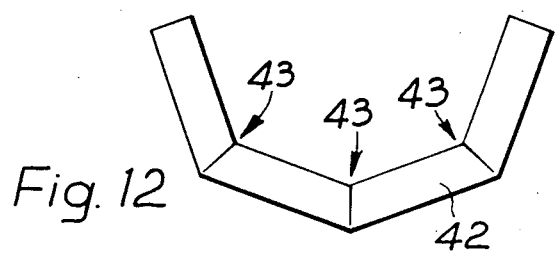
FIG. 12 shows the panel of FIG. 11 flexed along the lines of the grooves.

The panel 42 shown in FIGS. 11 and 12 is similar to the panel shown in FIGS. 9 and 10 except that a number (three in the embodiment shown) of grooves 43 are formed in the top surface of the panel. When the panel of FIG. 11 is flexed along the lines of the grooves 43 as shown in FIG. 12, the resulting flexed panel is more closely arcuate in cross-section as can be seen by comparing FIGS. 10 and 12. Similar treatments may be applied to the panel shown in FIGS. 11 and 12 as those mentioned above in respect of FIGS. 9 and 10.

I claim:

1. A thermal insulation body comprising:
    a reinforcing honeycomb structure; and
    a finely divided thermal insulation material comprising a microporous insulation material selected from the group consisting of silica aerogel and pyrogenic silica, the finely divided thermal insulation material being compacted into the cells of the honeycomb structure such that residual pressure in the insulation material acts against the walls of the honeycomb structure so as to hold the walls of the honeycomb structure firmly in position.

2. A thermal insulation body according to claim 1 and including a skin bonded to at least one face of the body.

3. A thermal insulation body according to claim 2, wherein the skin is composed of a material selected from the group consisting of metals, plastics, woven or non-woven fabric and paper.

4. A thermal insulation body according to claim 1, wherein the honeycomb structure is composed of a material selected from the group consisting of metals, inorganic and organic materials.

5. A thermal insulation body according to claim 4, wherein the honeycomb structure is made of paper.

6. A thermal insulation body according to claim 5, wherein the paper is stiffened with a phenolic resin.

7. A thermal insulation body according to claim 1, wherein the finely divided thermal insulation material includes an infra-red opacification material.

8. A thermal insulation body according to claim 1, wherein the finely divided thermal insulation material includes a reinforcing fibre material.

9. A method of manufacturing a thermal insulation body comprising the step of compacting a finely divided thermal insulation material comprising a microporous insulation material selected from the group consisting of silica aerogel and pyrogenic silica into the cells of a reinforcing honeycomb structure such that residual pressure in the insulation material acts against the walls of the honeycomb structure so as to hold the walls of the honeycomb structure firmly in position.

10. A method according to claim 9 and including the further step of bonding a skin to at least one face of the body.

11. A method according to claim 9 and including the steps of forming the body into a circular, semi-circular or arcuate shape and bonding a skin to the radially inner face of the body.

12. A method according to claim 9 and including the steps of forming the honeycomb structure with a circular, semicircular or arcuate shape prior to compacting the insulation material into the cells of the honeycomb structure, and subsequent to the compacting step bonding a skin to the radially inner face of the body.

13. A method according to claim 10 and including the step of forming at least one V-shaped groove in one face of the body, which groove extends substantially to the skin bonded to the other face of the body.

14. A method according to claim 9, wherein the compaction is effected by means of at least one roller.

* * * * *